(12) United States Patent
Braskich et al.

(10) Patent No.: US 7,461,253 B2
(45) Date of Patent: Dec. 2, 2008

(54) METHOD AND APPARATUS FOR PROVIDING A KEY FOR SECURE COMMUNICATIONS

(75) Inventors: Anthony J. Braskich, Palatine, IL (US); Stephen P. Emeott, Rolling Meadows, IL (US)

(73) Assignee: Motorola, Inc., Scaumburg, IL (US)

( * ) Notice: Subject to any disclaimer, the term of this patent is extended or adjusted under 35 U.S.C. 154(b) by 138 days.

(21) Appl. No.: 11/561,443

(22) Filed: Nov. 20, 2006

(65) Prior Publication Data

US 2008/0016350 A1 Jan. 17, 2008

Related U.S. Application Data

(60) Provisional application No. 60/739,579, filed on Nov. 22, 2005.

(51) Int. Cl.
*H04L 9/32* (2006.01)
*H04M 1/66* (2006.01)
*G06F 15/16* (2006.01)

(52) U.S. Cl. .......................... 713/169; 713/168; 726/2; 709/227; 709/228; 380/284; 370/331; 455/411

(58) Field of Classification Search ................ 713/168, 713/169; 726/2; 380/284; 370/331; 455/411; 709/227, 228
See application file for complete search history.

(56) References Cited

U.S. PATENT DOCUMENTS

2004/0240412 A1* 12/2004 Winget ..................... 370/331
2005/0032506 A1* 2/2005 Walker ........................ 455/411
2006/0067272 A1* 3/2006 Wang et al. .................. 370/331
2006/0067526 A1* 3/2006 Faccin et al. .................. 380/46
2007/0097934 A1* 5/2007 Walker et al. ................ 370/338
2007/0192600 A1* 8/2007 Wong et al. .................. 713/168

OTHER PUBLICATIONS

IEEE Computer Society. "IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 6: Medium Access Control (MAC) Security Enhancements", Jul. 2004.*
Chen, Jyh-Cheng et al. "Wireless LAN Security and IEEE 802.11i", Feb. 2005.*
Aboba, Bernard. "IEEE 802.1X Pre-Authentication", Jun. 2002.*
Altunbasak, Hayriye et al. "Alternative Pair-wise Key Exchange Protocols for Robust Security Networks (IEEE 802.11i) in Wireless LANs", 2004 IEEE.*

* cited by examiner

*Primary Examiner*—Michael J Simitoski

(57) ABSTRACT

A method and apparatus for providing a key for secure communications is provided herein. During operation a node wishing to join a network, will authenticate with an authentication server and then derive a pairwise key (e.g., a Pairwise Transient Key (PTK)) used for encryption of unicast traffic. The node will also create its own group transient key (GTK) for use in encrypting multicast or broadcast traffic. Once the GTK is generated, it will be provided to an authenticator as part of an association request message.

14 Claims, 3 Drawing Sheets

100

200

METHOD AND APPARATUS FOR PROVIDING A KEY FOR SECURE COMMUNICATIONS

CROSS REFERENCE TO RELATED APPLICATIONS

This application claims priority to U.S. Patent Application No. 60/739,579 filed Nov. 22, 2005 titled "Method and Apparatus for Providing a Key for Secure Communications".

FIELD OF THE INVENTION

The present invention relates generally to secure communication of nodes within a network and in particular, to a method and apparatus for providing a group key for secure communications.

BACKGROUND OF THE INVENTION

Secure communications between nodes within a communication system often require the encryption of communications between the nodes. As one of ordinary skill in the art will recognize, the use of encryption requires that "keys" be shared among nodes. A problem exists in that oftentimes the sharing of keys among nodes requires extensive messaging between the nodes. Therefore a need exists for a method and apparatus for providing a key for secure communications that reduces the number of messages that need to be transmitted between nodes.

DETAILED DESCRIPTION OF THE DRAWINGS

In order to address the above-mentioned need, a method and apparatus for providing a key for secure communications is provided herein. During operation a node wishing to join a network, will authenticate with an authentication server and then derive a pairwise key (e.g., a Pair-wise Transient Key (PTK)) used for encryption of unicast traffic. The node will also create its own group transient key (GTK) for use in encrypting multicast or broadcast traffic. Once the GTK is generated, it will be provided to an authenticator as part of an association request message.

The present invention encompasses a method for mutual authentication of a first and a second node in a peer-to-peer network. The method comprises the steps of sending a first authentication message to the second node, receiving a second authentication message from the second node, deriving a pair-wise transient key (PTK) used for encryption of unicast traffic and a group transient key (GTK) use in encrypting multicast or broadcast traffic, and sending an association request message to the second node. The association message comprises information needed by the second node to validate the PTK, and the GTK used by the first node. Finally, an association response message is received from the second node. The association response message comprises information needed by the first node to validate the PTK and a GTK used by the second node.

The present invention additionally encompasses an apparatus for performing mutual authentication. The apparatus comprises a transmitter sending a first authentication message to a second node, a receiver receiving a second authentication message from the second node, and a logic unit deriving a pair-wise transient key (PTK) used for encryption of unicast traffic and a group transient key (GTK) use in encrypting multicast or broadcast traffic. The transmitter additionally transmits an association request message to the second node. The association message comprises information needed by the second node to validate the PTK, and the GTK used by the first node. The receiver additionally receives an association response message from the second node. The association response message comprises information needed by the first node to validate the PTK and a GTK used by the second node.

Figure 1:
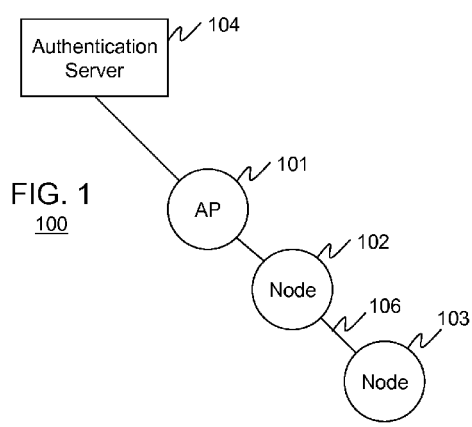
FIG. 1 is a block diagram of a network.

Turning now to the drawings, wherein like numerals designate like components, FIG. 1 is a block diagram of network 100. In the preferred embodiment of the present invention, network 100 utilizes a network protocol as described by the IEEE 802.11 specification. However, in alternate embodiments network 100 may utilize other network protocols such as, but not limited to, a network protocol defined by the IEEE 802.16 standard, a network protocol defined by the IEEE 802.15.3 Wireless Personal Area Networks for High Data Rates standard, or the network protocol defined by the IEEE 802.15.4 Low Rate Wireless Personal Area Networks standard, . . . , etc.

Network 100 includes a number of network elements such as access point 101, node 102, node 103, and server 104. Although only a single access point 101 and two nodes 102 and 103 are shown, one of ordinary skill in the art will recognize that typical networks comprise many access points in communication with many nodes.

As shown, node 103 and node 102 are in communication via communication signal 106. Communication signal 106 preferably comprises transmissions over an RF communication channel, but alternatively may comprise any transmission, either wired or wireless. It is contemplated that network elements within network 100 are configured in well known manners with processors, memories, instruction sets, and the like, which function in any suitable manner to perform the function set forth herein.

When node 103 wishes to communicate with node 102, an authentication procedure will need to take place. During operation, node 102 authenticates node 103 by enabling a full authentication exchange between node 103 and authentication server 104. Once authentication has completed, communication then can take place between nodes 102 and 103. Particularly, authentication with network 100 will result in server 104 providing node 102 the Pair-wise Master Key (PMK) that is calculated by node 103 during authentication. The PMK may then be utilized to generate temporary session keys (e.g., a Pair-wise Transient Key (PTK)) used for encryption and authorization. More specifically, each communication session between a first node and a second node utilizes a session key for such things as encrypting and providing integrity protection for the exchanged traffic. The session key used for a particular node is a function of the PMK, Node Identifiers, and two other numbers (fresh values, FV). In other words:

Session key=f(PMK, first_node_ID, second_node_ID, first_node_FV, second_node_FV).

The first_node_FV is generated by the first node and the second_node_FV is generated by the second node. In the preferred embodiment of the present invention fresh values comprise random numbers. In alternate embodiments, however, fresh values may comprise other forms such as, but not limited to time stamps, frame numbers, and nonces.

Figure 2:
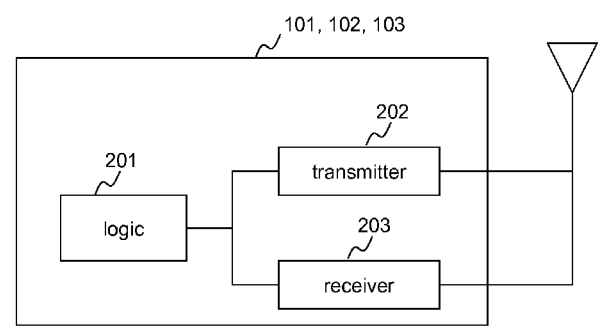
FIG. 2 is a block diagram of a node within the network of FIG. 1.

FIG. 2 is a block diagram of node 200. As shown, node 200 comprises logic circuitry 201, transmit circuitry 202, and receive circuitry 203. Logic circuitry 201 preferably comprises a microprocessor controller, such as, but not limited to a Motorola PowerPC microprocessor. In the preferred embodiment of the present invention logic circuitry 201 serves as means for controlling node 200, and as means for analyzing received message content, and means for generating messaging necessary for authentication. Transmit and receive circuitry 202-203 are common circuitry known in the art for communication utilizing a well known network protocols, and serve as means for transmitting and receiving messages. For example, for nodes 101-103, transmitter 202 and receiver 203 are well known IEEE 802.11 transmitters and receivers that utilize the IEEE 802.11 network protocol. Other possible transmitters and receivers include, but are not limited to transceivers utilizing Bluetooth, IEEE 802.16, or HyperLAN protocols.

Figure 3:
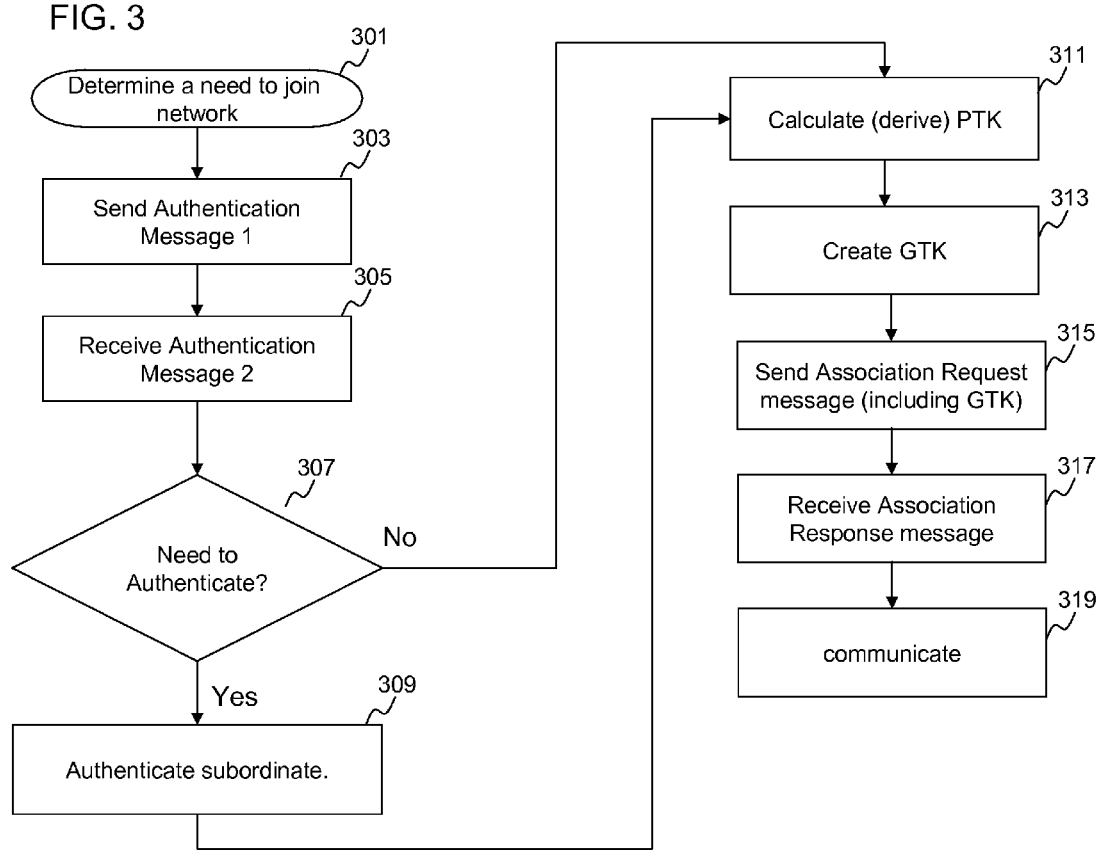
FIG. 3 is a flow chart showing operation of the node of FIG. 2.

FIG. 3 is a flow chart showing operation of node 200 (e.g., a first node, which is a subordinate node) during authentication. The logic flow begins at step 301 when logic circuitry 201 determines a need to join network 100. At step 303 logic circuitry 201 instructs transmitter 202 to transmit a first authentication message. The first authentication message comprises information needed for a second node (superordinate node) to authenticate the first node. The information needed for the second node to authenticate the first node comprises a Robust Security Network (RSN) information element identifying a key suite to be used for authenticating the first node, and an Extensible Authentication Protocol over LAN Key (EAPOL-Key) message containing a nonce created by the first node. The RSN information element in the first authentication message also optionally identifies a pair-wise master key to be used for deriving the PTK.

At step 305 a second authentication message is received by receiver 203. The second authentication message is received from the second node and comprises information needed by the first node for the first node to be authenticated by the second node. The information needed by the first node for the first node to be authenticated by the second node comprises an RSN information element identifying a key suite to be used for authenticating the first node, and an EAPOL-Key message containing a nonce created by the second node. The RSN information element in the second authentication message also optionally identifies a pair-wise master key to be used for deriving the PTK.

At step 307 a determination is made by logic circuitry 201 whether or not the first node needs to be authenticated. Particularly, if the first node has previously authenticated with the second node, such as during previous communication, and a pair-wise master key was stored at the second node, then authentication may not be required. Alternatively, pre-programmed keys, shared between the first and second node, may be in place, preventing the need for authentication to create a pair-wise master key.

If, at step 307 it is determined that authentication needs to take place, then the logic flow continues to step 309 where authentication server 104 is accessed by logic circuitry 201, and the first node is authenticated. If, however, it is determined that authentication does not need to take place, the logic flow continues to step 311.

At step 311 the PTK is derived by logic unit 201, and at step 313 the group transient key (GTK) is created by logic unit 201. The PTK is used for encrypted communication between the first and the second nodes. More particularly, a portion, or subset, of the PTK may be used to encrypt and protect the integrity of data traffic sent between the first and second nodes. Other portions of the PTK may be used for specialized functions such as securing keys during transport between the first and second nodes. The GTK is used to encrypt and protect the integrity of multicast data traffic sent by a node.

At step 315, an association request message is sent by transmitter 202. The association request message comprises information needed by the second node to derive and validate a PTK. The information needed by the second node to derive and validate a PTK comprises an RSN information element identifying a pair-wise master key used for deriving the PTK, and an EAPOL-Key message containing a message integrity check value calculated using the PTK, and a GTK used by the first node. The GTK is encrypted using a portion of the PTK.

At step 317 receiver 203 receives an association response message. The association response message comprises information needed by the first node to validate the PTK. The information needed by the first node to validate the PTK comprises an RSN information element identifying a pair-wise master key used for deriving the PTK, and an EAPOL-Key message containing a message integrity check value calculated using the PTK, and a GTK used by the second node. The GTK is encrypted using a portion of the PTK.

Finally, at step 319 authenticated communications takes place between the first and the second nodes.

Figure 4:
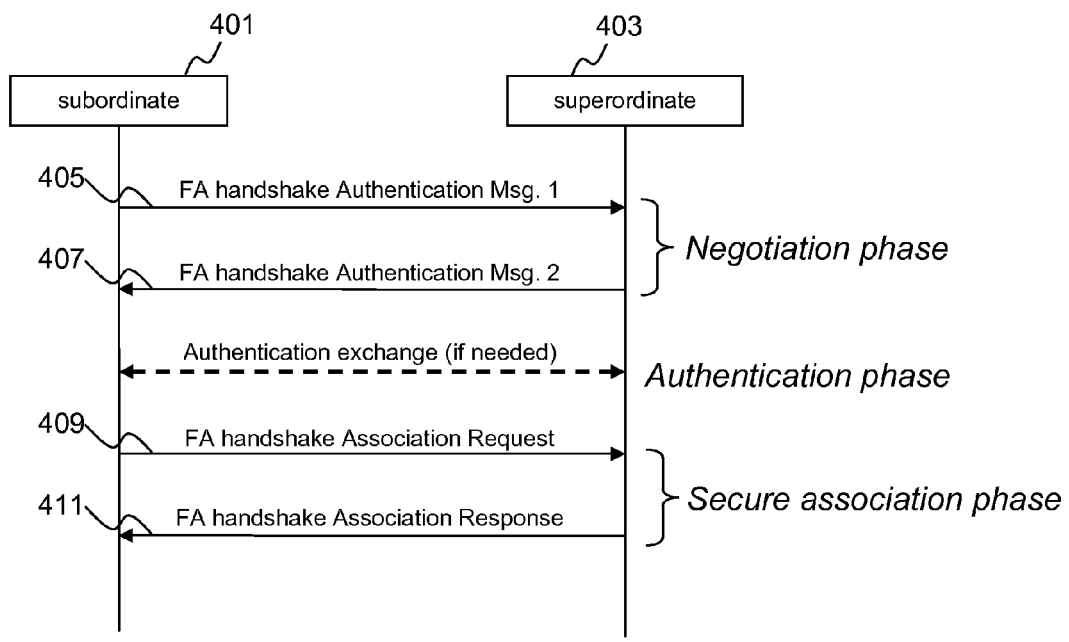
FIG. 4 is a message-flow diagram illustrating messaging between nodes during authentication.

FIG. 4 is a message flow diagram showing messaging between nodes during authentication. In FIG. 4, superordinate node 403 will need to authenticate subordinate node 401. As shown, authentication can be broken down into a negotiation phase, an authentication phase, and a secure association phase. During the negotiation phase the first authentication message is sent from subordinate node 401 to superordinate node 403, while a second authentication message is sent from superordinate node 403 to the subordinate node 401. With the information provided in the first and the second authentication messages, node 403 can properly authenticate node 401 during the authentication phase. Finally, during secure association, an association request message is sent from subordinate node 401 and an association response message is sent from superordinate node 403. During the secure association phase each node 401 and 403 derives the appropriate PTK necessary for secure communication.

First authentication message 405 in the authentication handshake is sent from subordinate node 401 to superordinate node 403. First authentication message 405 comprises a plurality of information elements, which are needed for the superordinate node to authenticate the subordinate node. The plurality of information elements comprises an RSN information element identifying a key suite to be used for authenticating the subordinate node, and an EAPOL-Key message containing a nonce created by the subordinate node. The RSN information element also optionally identifies a pair-wise master key to be used for deriving the PTK.

Second authentication message 407 in the authentication handshake is sent from superordinate node 403 to subordinate node 401. Second authentication message 407 comprises a plurality of information elements, which are needed by the subordinate node for the subordinate node to be authenticated by the superordinate node. The plurality of information elements comprises an RSN information element identifying a key suite to be used for authenticating the subordinate node, and an EAPOL-Key message containing a nonce created by the superordinate node. The RSN information element also optionally identifies a pair-wise master key to be used for deriving the PTK.

Association request message 409 in the authentication handshake is sent from subordinate node 401 to superordinate node 403. Association request message 409 comprises a plurality of information elements, which are needed for the superordinate node to derive and validate a PTK. The plurality of information elements comprises an RSN information element identifying a pair-wise master key used for deriving the PTK, and an EAPOL-Key message containing a message integrity check value calculated using the PTK, and a GTK used by the subordinate node. The GTK is encrypted using a portion of the PTK.

Association response message 411 in the authentication handshake is sent from superordinate node 403 to subordinate node 401. Association response message 411 comprises a plurality of information elements, which are needed by the subordinate node to validate the PTK. The plurality of information elements comprises an RSN information element identifying a pair-wise master key used for deriving the PTK, and an EAPOL-Key message containing a message integrity check value calculated using the PTK, and a GTK used by the superordinate node. The GTK is encrypted using a portion of the PTK.

As discussed above, network 100 utilizes a network protocol as described by the IEEE 802.11 specification. The following text provides changes to the IEEE 802.11 specification that facilitate the above-described messaging.

5.3.1 Specific Management Frame Types 5.3.1.6 Authentication Frame Format

Add the following row to the end of IEEE Std 802.11®-1999 Table 14 in Clause "7.2.3.10 Authentication frame format":

TABLE 1

Presence of information elements

| Authentication algorithm | Authentication transaction sequence no. | Status code | Presence of information elements |
|---|---|---|---|
| Mesh Fast Authentication | 1 | Reserved | RSNIE, EAPKIE present |
| Mesh Fast Authentication | 2 | Status | RSNIE, TIE, EAPKIE present |

5.3.3 Information Elements 5.3.3.1 WLAN Mesh Capability Element

Change the figure and table to reflect the addition of the security field:

TABLE 2

WLAN Mesh Capability Element

| Octets: 1 | 1 | 1 | 4 | 4 | 2 | 1 | 1 | 4 | 4 | 1 |
|---|---|---|---|---|---|---|---|---|---|---|
| ID | Length | Version | Active Protocol ID | Active Metric ID | Peer Capacity | Power Save capability | Synchronization Capability | Channel Precedence | Multi-Channel Capability | Security |

TABLE 3

WLAN Mesh Capability Element Fields

| Field | Value/description |
|---|---|
| Security | Security capability |

Add the following text before 5.3.3.1:

The security field indicates the security capabilities of the MP. The security field is defined in Table 4:

TABLE 4

Security field

| B7 | B6-B0 |
|---|---|
| FA Handshake | Reserved |

The FA Handshake bit indicates, when set, that the MP supports the fast authentication handshake defined in 6.5.4.

5.3.3.15 Time Interval Element (From 802.11 TGr Draft D0.09)

This generic Time Interval Information Element is defined to specify various types of time intervals and timeouts. This information element is defined in Table 5.

TABLE 5

Time Interval Information Element

| Octets: 1 | 1 | 1 | 2 |
|---|---|---|---|
| Element ID | Length | Interval type | Interval value |

The length field shall contain a value 0x03.

The Interval type field must contain one of the values from the table:

| Value | Meaning |
|---|---|
| 0x00 | Reserved |
| 0x01 | Re-Association Deadline (in TUs) |
| 0x02 | Key Lifetime Interval (in minutes) |
| 0x03 | Handshake Completion Deadline (in TUs) |
| 0x04-0xFF | Reserved |

The interval value shall be an unsigned 16-bit integer representing the number of TUs if the type value is Re-Association Deadline (0x01) or Handshake Completion Deadline (0x03), or minutes if the type value is Key Lifetime (0x02).

5.3.3.16 802.1X EAPOL-Key Element (EAPKIE) (From 802.11 TGr Draft 0.09)

This element is defined to encapsulate an 802.1X EAPOL-Key message. The information element is defined in Table 6.

TABLE 6

| Encapsulated 802.1X EAPOL-Key Information Element | | |
| --- | --- | --- |
| Octets: 1 | 1 | Variable |
| Element ID | Length | 802.1X EAPOL-Key message |

The length shall be set to the length of the EAPOL-Key message.

5.3.3.17 Count Element (From 802.11 TGr Draft 0.09)

The Count Information Element specifies the number of Information Elements that are integrity-protected by their inclusion in the MIC in a subsequent EAPKIE. The value includes the Count IE itself, and all subsequent IEs up through and including the EAPKIE.

6.5.4 Fast Authentication Handshake

The Fast Authentication (FA) handshake is an optional procedure that may be used to establish a secure association between two MPs in a WLAN mesh. The FA handshake may be used in place of association followed by two 4-way handshakes to establish security.

The FA handshake is compatible with all supported AKM suites. Additionally, both centralized and distributed authentication are supported.

The FA handshake efficiently completes association and RSNA security establishment. To do this, it employs Authentication and Association management frames to carry the messages of the 4-way handshake in information elements. A result of the FA handshake is creation of a PTK for use in protecting data traffic.

The FA handshake enables a group key (GTK) to be established for both the subordinate and superordinate MPs. This enables both MPs to securely transmit multicast traffic. The GTKs are exchanged as a portion of the final two messages of the FA handshake.

Because the GTKs are transmitted within the FA handshake, it is not necessary to perform two PTK derivations while establishing a security association. A single PTK is derived during the handshake, with the subordinate acting as supplicant and the superordinate acting as authenticator.

The FA handshake may be conceptually divided into three phases, which are described in detail in the following section. Within these phases, the four messages constituting the FA handshake are exchanged. The details of these messages, and, in particular, the method of performing the PTK derivation, is given in "6.5.4.2 PTK Derivation in the FA Handshake".

6.5.4.1 Phases of the FA Handshake

The FA handshake consists of three non-overlapping phases: negotiation, authentication, and secure association. The authentication phase may be omitted if key-generating authentication is not needed or has occurred (specifically, a valid PMKSA is required in order to derive a PTK).

The negotiation phase consists of the two Authentication transaction messages of the FA handshake. The secure association phase consists of the Association Request and Response messages of the FA handshake. The contents of these four messages are described in detail in a subsequent section. The remainder of this section focuses on the overall FA handshake procedure and determining the need for and contents of the authentication phase. The FA handshake is summarized in FIG. 4.

During the authentication phase, the superordinate MP may be required to act as an 802.1X authenticator, to enable EAP authentication of the subordinate MP. It is assumed that the superordinate is able to connect to a remote AS via the mesh, if the AS is not implemented locally.

6.5.4.1.1 Negotiation Phase

The first two messages of the FA handshake permit a negotiation of the cipher suites and AKM suites that affect the derivation of the PTK. The negotiation takes place using the RSN IE.

Prior to initiating the FA handshake, it is assumed that the subordinate MP will have received a beacon or probe response from the superordinate that contains an RSN IE. This RSN IE advertises the cipher suites and AKM suites supported by the superordinate, as well as its ability to perform the FA handshake.

To begin the FA handshake, the subordinate sends the FA Handshake Authentication Message 1. An RSN IE is included that specifies the subordinate's desired cipher suite and AKM suite for use in deriving the PTK. The selected suites must be among those supported by the superordinate. The RSN IE may also include one or more PMKIDs referring to PMKSAs that the subordinate believes to be valid for deriving the PTK.

FA Handshake Authentication Message 2 is sent from the superordinate to the subordinate. The superordinate includes an RSN IE that echoes the subordinate's desired cipher suite and AKM suite for use in deriving the PTK. If one or more valid PMKIDs were specified by the subordinate, the superordinate includes one of these PMKIDs to indicate the PMKSA to be used. If no PMKID is included in the RSN IE, a PMK must be created, such as via 802.1X authentication.

6.5.4.1.2 Authentication Phase

The authentication phase of the FA handshake occurs, if necessary, before the FA Handshake Association Request is sent. The need for the authentication phase is determined by the contents of the PMKID list in the RSN IE contained in Authentication Message 2.

If no valid PMKID was included in the RSN IE, then the subordinate must authenticate during the authentication phase. To initiate 802.1X authentication, the superordinate will send an EAP Request/Identity message to the subordinate. Authentication is complete when the EAP-Success message is sent to the subordinate.

6.5.4.1.3 Secure Association Phase

The secure association phase of the FA handshake consists of the FA Handshake Association Request & Response messages. This phase completes the derivation and validation of the PTK.

The subordinate initiates the secure association phase by sending an Association Request message. The subordinate includes an RSN IE specifying the negotiated AKM and cipher suites to be used in deriving the PTK. Additionally, the PMK to be used for derivation of the PTK is included in the PMKID list, whether it was specified in the negotiation phase or was newly created in the authentication phase. The subordinate's group key (GTK) is transmitted in the Association Request message, as well.

The superordinate completes the FA handshake by sending the Association Response message. The RSN IE from the Association Request message is included. The superordinate's group key (GTK) is transmitted in the Association Response message.

After the Association Response message has been sent, the PTK is installed for protection of pairwise traffic between the two MPs.

6.5.4.2 PTK Derivation in the FA Handshake

The negotiation phase of the FA Handshake comprises Authentication messages 1 and 2, while the secure association phase comprises the Association Request and Response messages. These four messages perform association between the subordinate and superordinate, along with the PTK derivation. The four FA Handshake messages can be used in place of an Association Request and Response, followed by a 4-way handshake.

The PTK derivation occurs through a message exchange between the subordinate's supplicant and superordinate's authenticator processes. The messages exchanged are EAPOL-Key messages, which are labeled PTK-#1, -#2, -#3, and -#4. The definitions of the EAPOL-Key messages are given in a subsequent section.

The calculation of the PTK is possible after the authentication phase has completed. The calculation relies on nonce values exchanged in Authentication messages 1 and 2. The PTK calculation is given by:

PTK=PRF-384 (PMK, "FA Pairwise key expansion", SNonce, ANonce, Min(A[sub], A[sup]), Max(A[sub], A[sup]))

where:
  PRF-384 is the pseudo-random function defined in 802.11 ma 8.5.1
  PMK is the pairwise master key that is valid for use in deriving the PTK
  SNonce is a nonce generated by the subordinate
  ANonce is a nonce generated by the superordinate
  A[sub] is the MAC address of the subordinate
  A[sup] is the MAC address of the superordinate In addition to the EAPOL-Key messages, the FA handshake messages contain other information elements that permit the PTK derivation to occur. The contents and format of the FA handshake messages are described in the subsequent sections.

6.5.4.2.1 FA Handshake Message Contents

The following description of each of the FA handshake messages indicates the information elements that must be included, for purposes of the PTK derivation. Because the IEs are included within an authentication set, the order of IEs is important.

FA handshake Authentication Message 1 is an authentication management frame sent from subordinate to superordinate. The authentication frame indicates "Mesh Fast Authentication" algorithm and sequence number "1". The frame contains the following IEs:

TABLE 7

FA handshake Authentication Message 1

| Order | Information | Notes |
|---|---|---|
| T.B.D. | RSNIE | One AKM and one pairwise cipher suite are specified, and must be among those advertised by the superordinate in its beacons and probe responses. The group cipher suite shall be the suite specified by the superordinate in its beacons and probe responses. The PMKID list contains 0 or more PMKIDs that the subordinate believes to be valid for deriving the PTK. |
| T.B.D. | EAPKIE | Message PTK-#1 |

FA handshake Authentication Message 2 is an authentication management frame sent from superordinate to subordinate. The authentication frame indicates "Mesh Fast Authentication" algorithm and sequence number "2". The frame contains the following IEs:

TABLE 8

FA handshake Authentication Message 2

| Order | Information | Notes |
|---|---|---|
| T.B.D. | RSNIE | The RSNIE from Authentication message 1 is echoed. However, the PMKID list shall contain only one PMKID (from those specified in message 1) referring to a valid PMKSA. If no specified PMKSA is valid, the PMKID list is empty. |
| T.B.D. | TIE | Contains Handshake Completion Deadline, specifying time window in which the association request message must be sent |
| T.B.D. | EAPKIE | Message PTK-#2 |

FA handshake Association Request is an association request management frame sent from subordinate to superordinate. The frame contains the following IEs:

TABLE 9

FA handshake Association Request

| Order | Information | Notes |
|---|---|---|
| T.B.D. | Count IE | Count = 3 |
| T.B.D. | RSNIE | The PMKID list contains one PMKID, indicating the PMK to be used to derive the PTK. |
| T.B.D. | EAPKIE | Message PTK-#3 |

FA handshake Association Response is an association response management frame sent from superordinate to subordinate. The frame contains the following IEs:

TABLE 10

FA handshake Association Response

| Order | Information | Notes |
|---|---|---|
| T.B.D. | Count IE | Count = 4 |
| T.B.D. | RSNIE | The PMKID list contains one PMKID, indicating the PMK to be used to derive the PTK. |
| T.B.D. | TIE | Contains Key Lifetime of PMK used to derive the PTK. |
| T.B.D. | EAPKIE | Message PTK-#4 |

The EAPOL-Key messages included in the FA handshake are defined in the following section.

6.5.4.2.2 EAPOL-Key Message Definitions

The following notation is used to describe EAPOL-Key frames:

EAPOL-Key[S, M, A, I, K, Nonce, MIC, { }]
  S: means the initial key exchange is complete (Secure bit).
  M: means MIC is available in the message (Key MIC bit).
  A: means response is required to this message (Key Ack bit).
  I: install bit (for the pairwise key).
  K: is the key type, P (Pairwise), G (Group). (Key Type bit)
  Nonce: the Key Nonce field
  MIC: the integrity check calculated with the KCK.
  { }: indicates the contents of the Key Data field, which may include one or more IEs or KDEs.

The four EAPOL-Key messages used in the FA handshake are defined below:
PTK-#1: EAPOL-Key[0, 0, 0, 0, P, SNonce, 0, { }]
PTK-#2: EAPOL-Key[0, 0, 0, 0, P, ANonce, 0, { }]

PTK-#3: EAPOL-Key[1, 1, 1, 1, P, ANonce, MIC, {GTK (sub)}]
PTK-#4: EAPOL-Key[1, 1, 0, 1, P, SNonce, MIC, {GTK (sup)}]

In the above definitions,
  The MIC is calculated over the set of IEs beginning with the Count IE and continuing to the end of the EAPKIE.
  GTK(sup) is the group key created by the superordinate to protect its multicast traffic.
  GTK(sub) is the group key created by the subordinate to protect its multicast traffic.

6.5.4.2.3 Liveness Assurance

The messages of the FA handshake must occur within a time limit to ensure that replay or precomputation attacks do not occur. The subordinate is responsible for ensuring that responses to its request messages are received within a time limit. (This restricts the time between the two Authentication messages as well as between the Association Request and Response.) The superordinate is responsible for ensuring that the subordinate issues an association request within the Handshake Completion Deadline, sent in Authentication message 2.

6.5.4.2.4 Extensibility

It is possible to extend the FA handshake for use in networks with features other than those described here. For example, the FA handshake could be used when a derived-key hierarchy is in place for distributing unique PMKs.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method for mutual authentication of a first and a second node in a peer-to-peer network, the method comprising the steps of:
   sending a first authentication message to the second node containing information needed to authenticate the first node;
   receiving a second authentication message from the second node echoing at least some of the information transmitted in the first authentication message;
   determining responsive to the contents of the received second authentication message whether authentication is needed;
   deriving a pair-wise transient key (PTK) used for encryption of unicast traffic from a pair-wise master key created during authentication;
   sending an association message to the second node, the association message comprising both information needed by the second node to validate the PTK, and a group transient key (GTK) used by the first node in encrypting multicast or broadcast traffic; and
   receiving an association message from the second node, the association message comprising information needed by the first node to validate the PTK, and a GTK used by the second node, wherein the first authentication message comprises a nonce created by the first node and the second authentication message comprises a nonce created by the second node.

2. The method of claim 1 wherein the association message sent to the second node is an association request message.

3. The method of claim 1 wherein the association message received from the second node is an association response message.

4. The method of claim 1 wherein the first authentication message comprises information needed for the second node to authenticate the first node.

5. The method of claim 4 wherein the second authentication message comprises information needed by the first node for the first node to be authenticated by the second node.

6. The method of claim 1 wherein the information in the association message needed by the second node to validate the PTK comprises a Robust Security Network (RSN) information element identifying the pair-wise master key used for deriving the PTK, and a message integrity check value calculated using the PTK.

7. The method of claim 1 wherein the information in the association message needed by the first node to validate the PTK comprises an RSN information element identifying the pair-wise master key used for deriving the PTK, and a message integrity check value calculated using the PTK.

8. An apparatus for performing mutual authentication, the apparatus comprising:
   a transmitter sending a first authentication message to a second node containing information needed to authenticate a first node;
   a receiver receiving a second authentication message from the second node echoing at least some of the information transmitted in the first authentication message;
   a logic unit determining responsive to the contents of the received second authentication message whether authentication is needed and deriving a pair-wise transient key (PTK) used for encryption of unicast traffic from a pair-wise master key created during authentication; and
   wherein the transmitter additionally transmits an association message to the second node, the association message comprising both information needed by the second node to validate the PTK, and a group transient key (GTK) used by a first node in encrypting multicast or broadcast traffic; and
   the receiver additionally receives an association message from the second node, the association message comprising information needed by the first node to validate the PTK and a GTK used by the second, wherein the first authentication message comprises a nonce created by the first node and the second authentication message comprises a nonce created by the second node.

9. The apparatus of claim 8 wherein the association message sent to the second node is an association request message.

10. The apparatus of claim 8 wherein the association message received from the second node is an association response message.

11. The apparatus of claim 8 wherein the first authentication message comprises information needed for the second node to authenticate the first node.

12. The apparatus of claim 11 wherein the second authentication message comprises information needed by the first node for the first node to be authenticated by the second node.

13. The apparatus of claim 8 wherein the information in the association message needed by the second node to validate the PTK comprises a Robust Security Network (RSN) information element identifying the pair-wise master key used for deriving the PTK, and a message integrity check value calculated using the PTK.

14. The apparatus of claim 8 wherein the information in the association message needed by the first node to validate the PTK comprises an RSN information element identifying the pair-wise master key used for deriving the PTK, and a message integrity check value calculated using the PTK.

* * * * *